US 6,295,090 B1
Voltz et al.
Sep. 25, 2001

(54) APPARATUS FOR PROVIDING VIDEO RESOLUTION COMPENSATION WHEN CONVERTING ONE VIDEO SOURCE TO ANOTHER VIDEO SOURCE

(75) Inventors: Christopher Voltz; John C. Barker, both of Houston, TX (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 08/841,965

(22) Filed: Apr. 8, 1997

Related U.S. Application Data

(60) Provisional application No. 60/042,804, filed on Mar. 31, 1997.

(51) Int. Cl.[7] ............................................ H04N 7/01
(52) U.S. Cl. ...................... 348/441; 348/448; 348/445; 348/552; 348/555
(58) Field of Search ............................... 348/441, 443, 348/445, 448, 458, 459, 552, 556, 555, 554, 558; 345/154; H04N 7/01

(56) References Cited

U.S. PATENT DOCUMENTS

| | | | |
|---|---|---|---|
| 4,953,025 | * 8/1990 | Saitoh et al. | 358/140 |
| 4,980,836 | 12/1990 | Carter et al. | 364/483 |
| 5,257,103 | * 10/1993 | Vogeley et al. | 348/450 |
| 5,337,089 | * 8/1994 | Fisch | 348/446 |
| 5,365,276 | * 11/1994 | Imai et al. | 348/556 |
| 5,442,460 | * 8/1995 | Rhodes | 348/441 |
| 5,467,142 | * 11/1995 | Ichinokawa | 348/556 |
| 5,475,442 | * 12/1995 | Matsushita et al. | 348/554 |
| 5,528,301 | * 6/1996 | Hau et al. | 348/441 |
| 5,528,305 | * 6/1996 | Kim | 348/445 |
| 5,555,097 | * 9/1996 | Joung et al. | 386/123 |
| 5,602,654 | * 2/1997 | Patti et al. | 358/461 |
| 5,640,161 | * 6/1997 | Johnson et al. | 341/122 |
| 5,784,113 | * 7/1998 | Rhodes | 348/441 |
| 5,796,437 | * 8/1998 | Muraji et al. | 348/452 |
| 5,812,204 | * 9/1998 | Baker et al. | 348/453 |
| 5,812,210 | * 9/1998 | Arai et al. | 348/555 |

* cited by examiner

Primary Examiner—Reinhard J. Eisenzopf
Assistant Examiner—Jean W. Désir
(74) Attorney, Agent, or Firm—Sharp, Comfort & Merrett, P.C.

(57) ABSTRACT

An apparatus and system for providing video processing is disclosed. Within the system and the apparatus there is an analog video signal input means, which is connected to a video signal output means, which are both coupled to a video resolution compensation means. The analog video signal input means provides decoding of a first signal type received by the input means. The first signal type operates at a first refresh rate. The video signal output means receives the decoded first signal type and converts the decoded first signal type into a second signal type, which has a second refresh rate. This second signal type typically is compatible for viewing on a display incompatible with the first signal type. Then, the video resolution compensation means modifies the second refresh rate associated with the decoded second signal type so as to be compatible with the first refresh rate and displayable on the video monitor.

7 Claims, 3 Drawing Sheets

APPARATUS FOR PROVIDING VIDEO RESOLUTION COMPENSATION WHEN CONVERTING ONE VIDEO SOURCE TO ANOTHER VIDEO SOURCE

PRIORITY FILING DATE

Priority filing date for the present application is claimed under Provisional Application, Serial No. 60/042,804, filed Mar. 31, 1997 titled "APPARATUS FOR PROVIDING VIDEO RESOLUTION COMPENSATION WHEN CONVERTING ONE VIDEO SOURCE TO ANOTHER VIDEO SOURCE."

RELATED APPLICATIONS

This application is related to co-pending application Ser. No. 08/835,760 filed on Apr. 8, 1997, entitled "APPARATUS FOR SUPPORTING MULTIPLE VIDEO RESOURCES," incorporated by reference herein.

BACKGROUND OF THE INVENTION

1. The Field of the Invention

The present invention relates generally to video processing in a computer system and, more particularly, to converting a video signal to another type of video signal for display in a computer system. More particularly still, the present invention relates to a video processing system that provides resolution enhancement of a signal being converted from one standard to a second standard to be displayed on the computer system.

2. Prior Art

Personal computer systems are becoming much more versatile in their functionality and utilization. Most personal computers now include multimedia capabilities, such as being able to handle either video or audio input and output functions, or both. In handling selected video input sources, a typical computer normally operates in a digital mode and requires the input source material to be in digital form. The computer system, otherwise, must be able to convert non-digital information into digital information for further processing and subsequent output. Specifically, a typical multimedia computer will be able to accept various input sources and then convert them into digital form for output on a digital monitor normally associated with a computer system. During the transformation from one standard, such as an analog signal, to a computer-compatible standard, meaning digital signal, degradation occurs to the signal during the transformation process. This degradation has typically been endured for the sake of at least having the information available and useful to some degree; however, just as computer systems have gotten faster and more efficient as well as better at handling with their traditional features, it is desired that even the multimedia applications, especially in the video mode, keep up with the improvements so that the quality of the output signal, regardless of its initial input source, is at a very high level as if the output signal had initially been obtained from a high-quality input source.

The typical multimedia setting of converting from one video standard to another is that of input of an analog signal into a computer system and then conversion of it for digital output on the monitor. One problem with analog signals is that typically they are in an interlaced format, meaning that half the screen lines, for example, the odd lines, are scanned first and then the remaining half of the scan lines, typically the even lines, are scanned second in such a fashion so that the two screens are interlaced together in order to enhance resolution. This is a problem since most computer video monitors are progressive scan, which results in better resolution. The analog image must be converted to display on the progressive monitor. When analog images are converted field by field, since each field has only half the information that is otherwise required for display, a very poor, if not unacceptable, image is obtained with a conversion from analog to digital.

Additionally, analog signals typically refresh at one rate while the computer output, which operates on a progressive scan monitor, refreshes at a different rate. Converting from one refresh rate to the other refresh rate may result in field dropping or repetition which results in jerky motion.

Another problem is that the resolution is different between the analog signal and the video display monitor. Since the resolution is different, the solution has typically been to expand the field or shrink the field in order to compensate for the different resolution standards between the analog and digital environments.

Accordingly, what is needed is a video processing system for use in a computer system that is able to receive analog video signals and convert them to digital video signals regardless of refresh rates and resolution differences. This system should be able to perform this conversion without the resulting degradation previously described above.

SUMMARY OF THE INVENTION

According to the present invention, an apparatus and system for providing video processing is disclosed. Within the system and the apparatus there is an analog video signal input means, which is connected to a video signal output means, which are both coupled to a video resolution compensation means. The analog video signal input means provides decoding of a first signal type received by the input means. The first signal type operates at a first resolution. The video system receives the decoded first signal type and modifies the second signal type to use a compatible second resolution. This second signal type typically is compatible for viewing on a display incompatible with the first signal type. Typically, the first signal type will have a resolution higher than the second signal type since it is an NTSC-compatible analog video signal, and the second signal type is a computer displayable analog signal of a different resolution and refresh rate than the NTSC standard.

DETAILED DESCRIPTION OF THE SPECIFIC EMBODIMENTS

Figure 1:
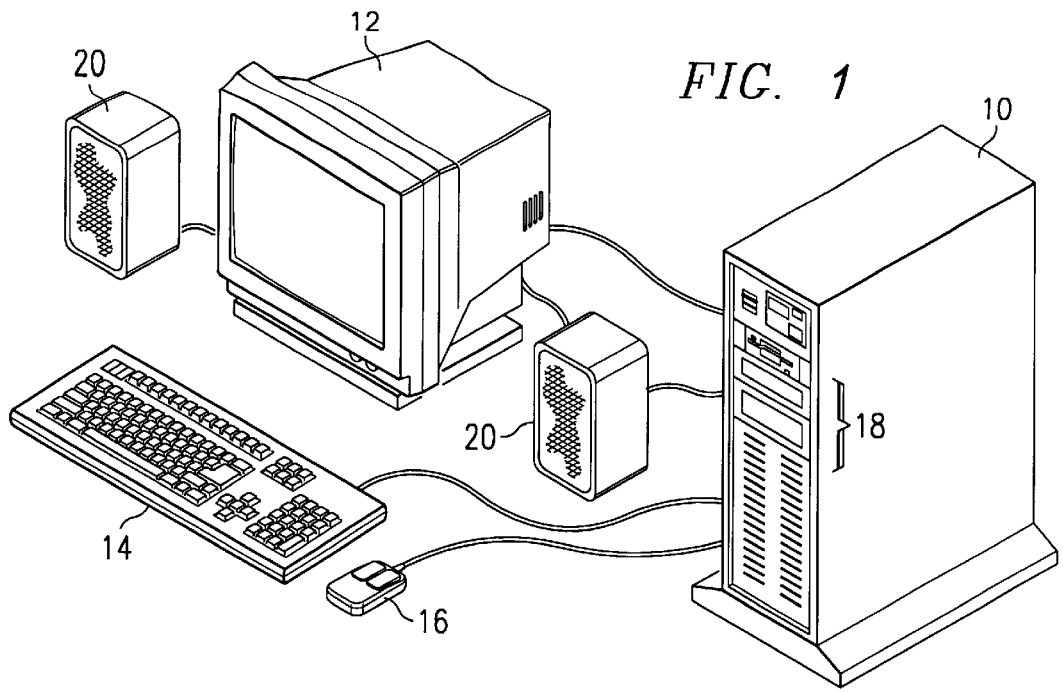
FIG. 1 is a block diagram of a multimedia computer system according to the present invention.
Figure 3:
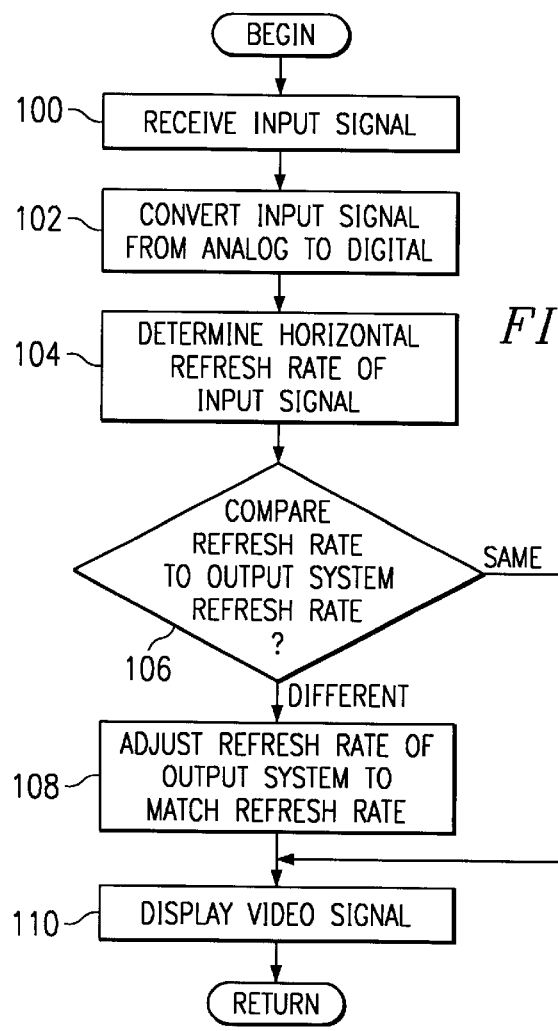
FIG. 3 is a diagram illustrating steps 100–110 included in a method of video compensation embodying the present invention.

Illustrated now in FIG. 1 is a computer system 10 according to the present invention. Computer 10 includes multimedia features and devices and includes a video monitor display 12, a keyboard 14, a pointing device such as mouse 16, disk storage device 18, and audio speakers 20. Disk storage device 18 may be any type of disk storage technology such as a floppy disk drive, a hard disk drive, or compact disc readable memory drive, or other type writeable or erasable storage devices typically known to those skilled in the art. Keyboard 14 provides data input for the user, as does pointing device 16. Additionally, video display 12 is typically a progressive scan, multi-sync monitor, but may also be able to display interlaced scanned imaging.

Within computer 10 there are other various devices for operation. These devices include a central processing unit, such as those typically provided by the Intel Corporation, such as the Pentium microprocessor, or the PowerPC microprocessor manufactured by IBM that is available for personal computing systems. It is intended that the microprocessor used within computer 10 be of such a design that it is not specifically limited to any of these types of microprocessor systems, but rather can be applied to any type of microprocessor processing system typically used in a personal computing system. Additionally, short-term memory that is operating at the same operating speed as the CPU, typically known as "cache memory," can be included. Random access memory (RAM) is also included for holding information and is responsive in a speed not as fast as the CPU or the cache, but much faster than the transfer rate of the hard disk storage device or any other long-term storage device provided in the computer 10. Additional control elements and peripheral devices are incorporated in the computer, and the fundamental construction of the desktop computer does not diverge substantially from those typically well-known to those skilled in the art. Likewise, rather than a desktop computer system as depicted in FIG. 1, computer 10 may be a laptop or other portable computer systems that have their components miniaturized for convenience in bulk and weight and transportability.

A system bus is typically provided that connects the central processing unit to the various other devices, such as keyboard 14, display monitor 12, pointing device 16 and disk storage means 18. A typical bus system is the Peripheral Component Interconnect (PCI) standard bus implemented commonly in many computer systems, but other bus systems are possible, including EISA, ISA, and MicroChannel, as well as a local bus design.

Further connected to the bus are a video/graphics board 30 for processing video information for output to display monitor 12 and an audio/tuner board for separating the audio portion of some multimedia signals input to computer system 10 for processing for output through speakers 20.

Figure 2A:
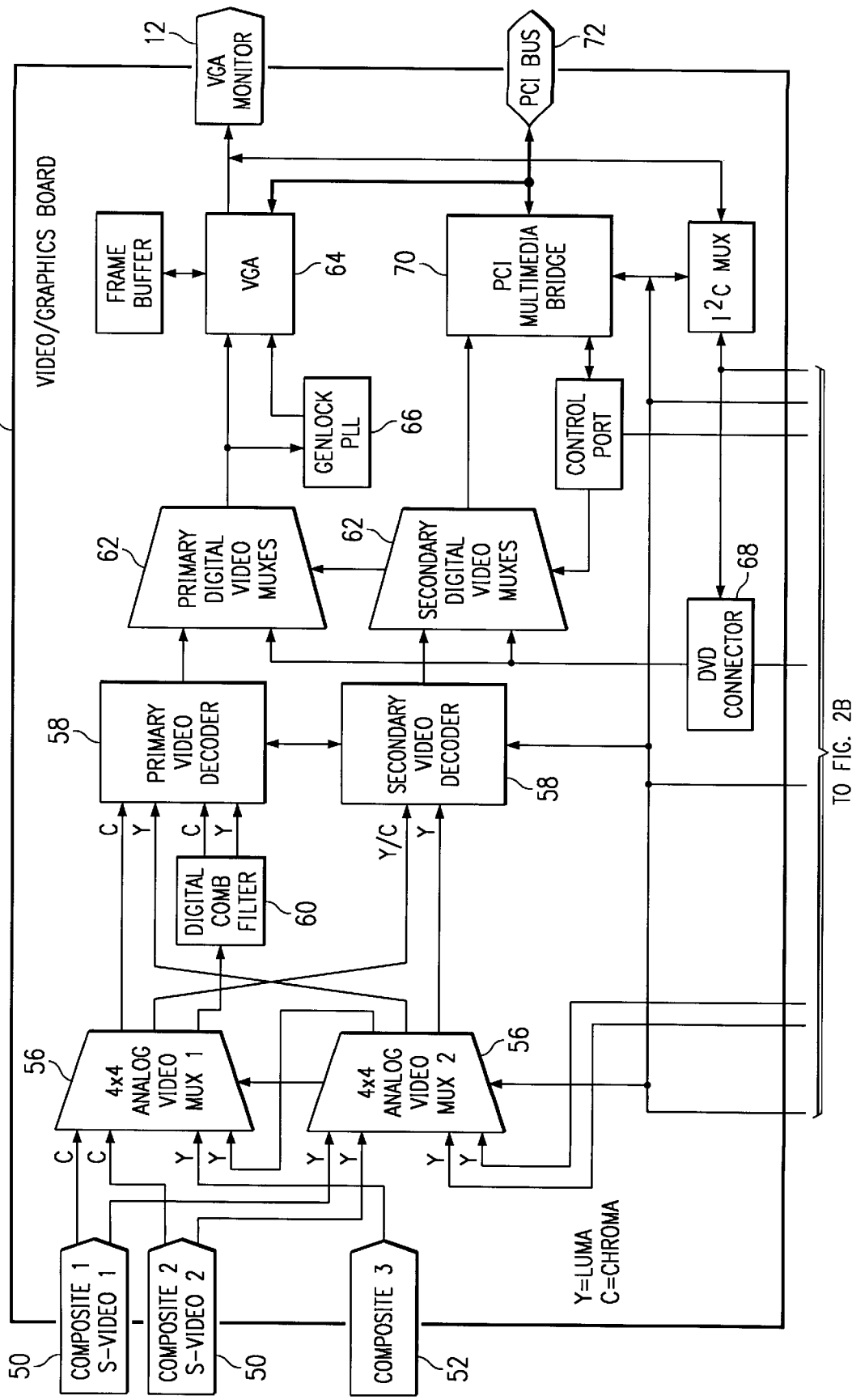
FIGS. 2A and 2B together show a block diagram of the video controller used with the computer system of FIG. 1.
Figure 2B:
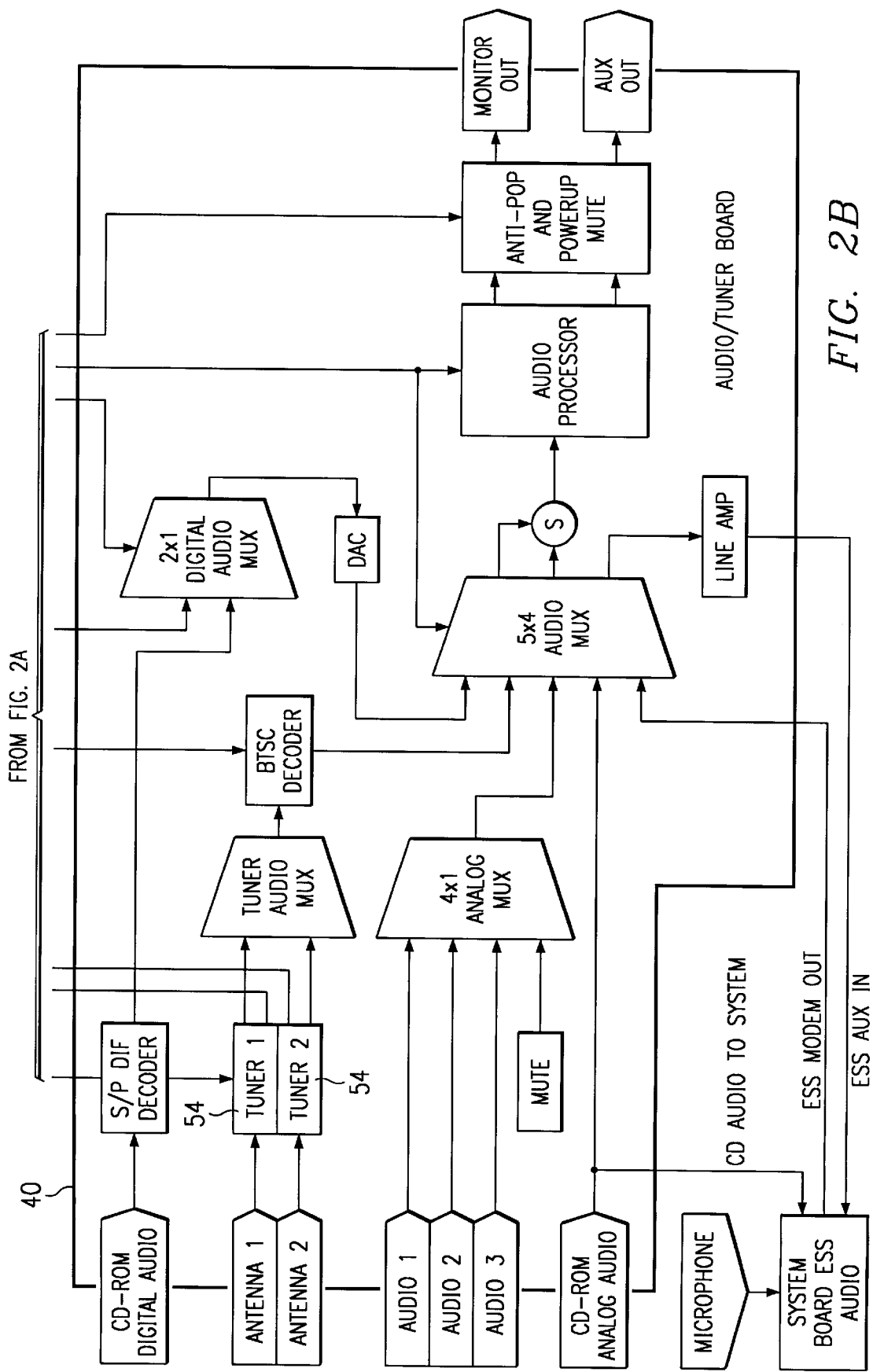

The video/graphics board 30 is further depicted in block diagram form in FIG. 2, as is audio/tuner board 40. Video/graphics board 30 can accept multiple video input sources such as S-video and composite video. These are input through S-video and composite connectors 50 and composite input connector 52. Additional input sources are provided from the audio/tuner board 40 through tuners 54, which provide RF tuning capability. The video input sources typically are analog signals that can be selected from System-M (NTSC), or any other type analog standard. Connectors 50, 52 and tuners 54 direct the signal to a first and second video multiplexers 56. When an S-video signal is sent to multiplexer 56, it is already separated into two different components. There is a Y component and a C component. The Y component includes the luma and synchronization necessary for the video signal, while the C component carries the chroma portion of the video signal. If the signal is in the form of a composite video signal, then the luma, chroma, and synchronization are all included and will be labeled under the Y component. Since connectors 50 can accept either a composite video signal or a S-video source, the connection for the chroma component is forwarded to the first video multiplexer 56, while the luma component is forwarded to the second video multiplexer 56. Likewise, the composite signal from RF tuner 54 is directed to the second video multiplexer 56.

Video multiplexers 56 are programmable so as to provide any combination of video signal output desired by the designer. A typical programming sequence for providing various combinations of signal output from different sources is depicted in Table 1. This illustrates how the primary video source is selected by the programmability of multiplexers 56. Likewise, the secondary video source selection is programmable through multiplexers 56.

| Primary Video | Video Mux 1 | | Video Mux 2 | | |
| --- | --- | --- | --- | --- | --- |
| Source Selection | Input | Output | Input | Output | Video Decoder |
| Composite 1 | 3 | 0 | 2 | 0 | S-Video 1 |
| Composite 2 | 3 | 0 | 3 | 0 | S-Video 1 |
| Composite 3 | 2 | 0 | — | — | S-Video 1 |
| S-Video 1 | 0 | 1 | 2 | 1 | S-Video 1 |
| S-Video 2 | 1 | 1 | 3 | 1 | S-Video 1 |
| Tuner 1 | 3 | 0 | 0 | 0 | S-Video 1 |
| Tuner 2 | 3 | 0 | 1 | 0 | S-Video 1 |

| Secondary Video | Video Mux 1 | | Video Mux 2 | | |
| --- | --- | --- | --- | --- | --- |
| Source Selection | Input | Output | Input | Output | Video Decoder |
| Composite 1 | — | — | 2 | 2 | Composite 2 |
| Composite 2 | — | — | 3 | 2 | Composite 2 |
| Composite 3 | 2 | 3 | — | — | Composite 4 |
| S-Video 1 | 0 | 2 | 2 | 3 | S-Video 2 |
| S-Video 2 | 1 | 2 | 3 | 3 | S-Video 2 |
| Tuner 1 | — | — | 0 | 2 | Composite 2 |
| Tuner 2 | — | — | 1 | 2 | Composite 2 |

A simple video multiplexer has been provided before, but no video multiplexer system has been provided that has been able to receive and manage multiple input sources and to multiple output destinations in the various combinations desired by the user or the designer. These combinations including, but not limited to a single video source, being delivered to multiple video streams. Accordingly, this video/graphics board 30 incorporates two programmable four-by-four video multiplexers 56, which can be obtained from Philips Corporation, Model No. TDA8540T. Parallel video streams or paths are provided to receive the signals from the first video multiplexer 56 and the second video multiplexer 56. Further, rather than use a large, single multiplexer, the multiple multiplexer design described herein allows great flexibility of programmability as each multiplexer can be independently programmed.

For composite video connector 52, the composite signal is sent to the first video multiplexer 56, which is then sent to video decoder 58 as composite or to digital comb filter 60, which separates the Y component from the C component of the signal and forwards the Y and C components to video decoder 58. Video decoder 58 is a Philips Corporation video decoder, Model No. SAA7111, type-decoder, but comparable equivalents can be selected instead and the invention is not so limited to one specific type of part.

The second video multiplexer 56 forwards its Y component either back to first video multiplexer 56 or to the first digital video decoder 58 or to the second digital video decoder 58.

The digital comb filter 60 processes the composite signal, which is divided into an S-video type signal which is sent to the first video decoder 58. Again, two paths are possible in that the first video decoder 58 sends the output signal to a first digital multiplexer 62, while the second video decoder 58 sends the decoded video signal to a second video multiplexer 62. Yet a third input source is possible at this time in that a digital video source may be input into either the first digital video multiplexer or the second digital video multiplexer 62. This connector is a digital multimedia connector 68 and also feeds an audio portion to the audio/tuner board 40. Typical digital video sources include MPEG encoded signal such as Digital Versatile Disk (DVD) and Digital Broadcast System (DBS).

The first digital video multiplexer 62 then selects the signal to provide the actual decoded video signal to be handled by a graphics controller 64 with timing information being sent to a phase lock loop (PLL) circuit, further connected to the graphics controller 64. The decoded signal from the second digital video decoder 58 is then multiplexed through the second digital video multiplexer 62 being selected from the decoded signal from video decoder 58 or from digital video source connector 68. This signal from the second digital video multiplexer 62 then proceeds to a second video processor 70. Video processor 70 performs additional video functions such as video scaling and also provides for a bus interface with the PCI bus 72 that interconnects the computer components one to another, as well as interconnects the secondary video processor 70 with the primary graphics controller 64. Then the final signal is output through primary graphics controller 64 to monitor 12.

The interconnection between multiplexers 56, video decoders 58, tuners 54, and video processor 70 are all accomplished over an IIC bus, which is the "inter-integrated circuit" bus and is also known as the I²C bus.

With multiple input and output sources now incorporated in the computer system, impedance problems now occur that didn't previously occur. For example, where a single video source is output to multiple video streams, the single video signal needs to be boosted, or buffered in order to support multiple video streams without undue degradation caused by the impedance change. Accordingly, multiplexers 56 include a buffer to allow the multiplexing of a single video signal to multiple video paths without such signal degradation. Signal isolation to the circuit is further provided to prevent each output and input connector from interfering with any of the others at all times.

The interaction between the video decoders 58, the digital video multiplexers 62 and graphics controller 64, PLL 66, and secondary video controller 70 is an important function of this system, especially where the video resolution enhancement provisions are concerned. The interaction is described in detail in U.S. patent application Ser. No. 08/828,522, entitled "HARDWARE SYSTEM FOR GENLOCKING," herein incorporated by reference for all purposes. Additionally, additional support for the processing of the video signals is described in U.S. patent application Ser. No. 08/827,977, entitled "METHOD AND APPARATUS FOR OFFSET OF VIDEO FIELDS," herein incorporated by reference for all purposes.

Within this system, the analog video signals that are to be displayed on the computer system that uses a standard PC graphics controller must be converted to be viewable on the computer video monitor. The analog signal can be in a non-standard refresh or sampling rate with a non-conforming resolution rate that translates poorly when displayed on the video monitor. As is well known, analog signals in System-M (NTSC) standard (as are many other applicable video standards) are interlaced and may have a conversion resolution of 720 by 480 pixels using a 13.5 MHZ sampling clock. The standard pixel rate for the system display is 25 MHZ, which translates to a resolution of 640×480. Since the resolution is lower in the standard display than is the resolution of the converted analog input signal, signal quality is affected and a lesser image is viewed than would otherwise be possible.

One solution would be to display the image at a much higher resolution, for example, 800×600, but this is a higher resolution than the converted video source's 720×480 and since the input signal does not have this high a resolution, a poor image would again result. This poor image would have black boarders either vertically, horizontally, or both. Further, memory is wasted by over allocating such a high resolution to an image having a lesser resolution. Another solution would be to scale the 720×480 image down to 640×480 or to sample the convert the analog input to a 640×480 resolution using a different sampling rate (i.e., square pixel sampling). Both of these approaches result in a loss of resolution and may result in aspect ratio problems.

So, the solution is to display the 720×480 non-standard resolution in the same time it takes to display the 640×480 standard resolution of the system display. This requires the graphics controller to increase the horizontal pixel rate to compensate for the additional pixels to be displayed. Further, with this modification of the display rate, the pixel aspect ratio of the input analog signal is preserved as no other conversion or translation is necessary. Thus, the 4:3 aspect ratio of the System-M (NTSC) standard is not put in the square pixel aspect ratio (i.e. 1:1) of the standard display resolution used in personal computers.

It is significant that this adjustment of the horizontal rate is performed in systems using analog displays. The use of this system would not be applicable to screens that are digital displays, such as square pixel LCD displays and the like.

Since there is provided a primary and a secondary video path, the secondary path provides for a second channel to be viewed and output. Typically, this second channel is scaled to be much smaller than the full field of display on monitor 12. This scaled image is a picture-in-picture (PIP) image for display on display monitor 12. This is shown in a selected location within the display. Further, this second video path can carry information such as that defined in Vertical Blanking Interval (VBI) that can carry other information such as from the Internet or other sources. In either case, the signal typically is processed in a YUV color space, but can also be processed in other color spaces, for example in RGB, as well. In order to be output to the display monitor 12, the secondary video processor 70 performs a burst mode over the PCI bus 72 to a graphics frame buffer within graphics controller 64. Before this, optional scaling of the image to conform to PIP standards may be performed in secondary video processor 70. Thus, the invention has been described with particular detail and understanding for implementation. It has been shown that a novel multiple analog video source multiplexer system has been provided that allows selection of various input sources for further processing and eventual output to the progressive scan monitor 12 within the system. This video multiplexer further has a connector scheme for accepting either S-video signals or composite video signals. In these connectors, the composite video signal connects to the S-video luma line, which shares a signal between the two connectors, with only one line being populated at a time. Additionally, the S-video and composite video typically are carried over four-pin mini-DIN, and the composite video alone is delivered over an RCA-type pin. Furthermore, an additional digital-to-analog converter can also be provided, when the output signal although having been processed from analog to digital is to be viewed on an analog video monitor. Accordingly, such a digital-to-analog conversion is then performed for output to such an analog display monitor.

It has been shown how to compensate a video image being converted from analog form to digital form so that the eventual display on a progressive scan analog monitor does not suffer the side effects of such a conversion. This conversion is achieved by adjusting the graphic controller's pixel rate to match the analog input source's conversion resolution.

The foregoing disclosure and description of the invention are illustrative and explanatory thereof, and various changes in the size, shape, materials, components, circuit elements, wiring connections and contacts, as well as the details of the illustrated design and construction and method of operation may be made without departing from the spirit of the invention.

What is claimed:

1. A video processing apparatus comprising:

an analog video signal input means, for decoding an NTSC compatible analog video signal received on said analog video signal input means, said NTSC compatible analog video signal having a first resolution defined by x pixels per display line generated at a first pixel frequency;

a video signal output means, for receiving said decoded first signal type for viewing on an NTSC-incompatible display, said display characterized by operation at a second pixel frequency, different from said first pixel frequency, and a resolution of y pixels per line, where y<x; and a video resolution compensation means, coupled to said analog video input means and said video signal output means, to receive said decoded NTSC compatible analog video signal and for modifying the second pixel frequency of the video signal output means to define display lines each having x pixels in the same time that would be taken by the video signal output means to create display lines of y pixels per line at said second frequency, thereby enabling a display according to and having the same resolution as said NTSC compatible analog video signal.

2. The video processing apparatus according to claim 1 wherein said NTSC compatible analog video signal is converted to an analog computer processed signal for display on a computer video display.

3. A video processing apparatus comprising:

an analog video signal input means, for decoding a first signal type received on said analog video signal input means, said first type signal having a first resolution defined by x pixels per display line generated at a first pixel frequency;

a video signal output means, for receiving said decoded first signal type for viewing on a display incompatible with said first signal type, said display characterized by operation at a second pixel frequency, different from said first pixel frequency, and a resolution of y pixels per line, wherein x=720 and y=640; and a video resolution compensation means, coupled to said analog video input means and said video signal output means, to receive said decoded first type signal and for modifying the second pixel frequency of the video signal output means to define display lines each having x pixels in the same time that would be taken by the video signal output means to create display lines of y pixels per line at said second frequency, thereby enabling a display according to and having the same resolution as said first type video signal.

4. A computer system capable of receiving and processing analog video signals for display, comprising: a processing unit; a data input device, coupled to said processing unit; a data output display, characterized by a resolution of m pixels per line, coupled to said processing unit; and a video signal processor comprising: an analog video signal input means, for decoding an NTSC-compatible analog video signal received on said analog video signal input means, said NTSC-compatible analog video signal having a first resolution defined by n pixels per line generated at a defined sampling rate; a video signal output means, for receiving said decoded NTSC-compatible analog video signal for inputting to said display; and a video resolution compensation means, coupled to said analog video input means and said video signal output means, for modifying the defined sampling rate at which said video signal output means is operated, to effect display by said display device of NTSC-compatible analog video signal display lines of n pixels per line in the same time that would be taken by the video signal output means to create display lines of m pixels per line at said defined sampling rate, thereby creating a display at a pixel rate synchronized with the pixel rate of said NTSC-compatible analog video input signal.

5. The computer system according to claim 4 wherein said NTSC-compatible analog video signal has a pixel resolution and pixel sampling rate higher than the characteristic pixel resolution of the display and the defined sampling rate, respectively, and wherein said synchronization preserves the resolution of said NTSC-compatible analog video signal when displayed on said display device.

6. The computer system according to claim 4 wherein said output video signal is an analog computer processed signal for display on a computer video display.

7. A computer system capable of receiving and processing analog video signals for display, comprising: a processing unit; a data input device, coupled to said processing unit; a data output display, characterized by a resolution of m pixels per line, coupled to said processing unit; and a video signal processor comprising: an analog video signal input means, for decoding a first signal type received on said analog video signal input means, said first type signal having a first resolution defined by n pixels per line generated at a defined sampling rate; a video signal output means, for receiving said decoded first signal type for inputting to said display; and a video resolution compensation means, coupled to said analog video input means and said video signal output means, for modifying the defined sampling rate at which said video signal output means is operated, to effect display by said display device of first type video signal display lines of n pixels per line in the same time that would be taken by the video signal output means to create display lines of m pixels per line at said defined sampling rate, thereby creating a display at a pixel rate synchronized with the pixel rate of said first type video input signal; wherein said display device characteristic line resolution is 640 pixels, and wherein said modified sampling rate at which said video signal output means is operated, generates a display on said display device of said first type input video signal having a line resolution of 720 pixels.

* * * * *